US007717092B2

(12) United States Patent
Wieczorek

(10) Patent No.: US 7,717,092 B2
(45) Date of Patent: May 18, 2010

(54) FUEL SYSTEM WITH AIR VENTING AND FUEL ANTI-DRAINBACK

(75) Inventor: Mark T. Wieczorek, Cookeville, TN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 615 days.

(21) Appl. No.: 11/464,384

(22) Filed: Aug. 14, 2006

(65) Prior Publication Data

US 2008/0035121 A1 Feb. 14, 2008

(51) Int. Cl.
*F02M 37/20* (2006.01)
*F16K 24/00* (2006.01)

(52) U.S. Cl. .................................. 123/516; 137/588

(58) Field of Classification Search ................. 123/510, 123/516; 137/588, 624.18, 625.39
See application file for complete search history.

(56) References Cited

U.S. PATENT DOCUMENTS

| | | | | |
|---|---|---|---|---|
| 3,491,788 | A * | 1/1970 | Kilayko | 137/218 |
| 5,336,166 | A * | 8/1994 | Sierra | 604/9 |
| 5,339,862 | A * | 8/1994 | Haunhorst | 137/614.05 |
| 5,522,769 | A * | 6/1996 | DeGuiseppi | 454/270 |
| 6,270,659 | B1 | 8/2001 | Bagci et al. | |
| 7,201,153 | B2 * | 4/2007 | Larsson | 123/510 |
| 2005/0081831 | A1 * | 4/2005 | Larsson | 123/510 |

FOREIGN PATENT DOCUMENTS

| | | |
|---|---|---|
| EP | 0 362 114 | 4/1990 |
| JP | 63-094067 | 4/1988 |
| JP | 3 141858 | 6/1991 |
| JP | 2001-140723 | 5/2001 |

OTHER PUBLICATIONS

From the corresponding PCT/US2007/074477, Form PCT/ISA/220, 3 pages.
From the corresponding PCT/US2007/074477, Form PCT/ISA/237, 4 pages.
From the corresponding PCT/US2007/074477, Form PCT/ISA/210, 3 pages.
From the corresponding PCT/US2007/074477, Form PCT/ISA/220, 3 pages, 2007.
From the corresponding PCT/US2007/074477, Form PCT/ISA/237, 4 pages, 2007.
From the corresponding PCT/US2007/074477, Form PCT/ISA/210, 3 pages, 2007.

* cited by examiner

*Primary Examiner*—Stephen K Cronin
*Assistant Examiner*—J. Page Hufty
(74) *Attorney, Agent, or Firm*—Hamre, Schumann, Mueller & Larson, P.C.; J. Bruce Schelkopf

(57) ABSTRACT

A fuel system of an engine is provided with a venting assembly to vent air that accumulates within a fuel filter of the fuel system and provides anti-drainback of clean fuel back toward the fuel filter when the engine is turned off. In one embodiment, the venting assembly includes a piston valve that provides both the vent and anti-drainback. The valve is actuatable by fluid pressure to a first position that restricts drainback, a second position that restricts venting, and intermediate positions between the first and second positions which permit venting.

27 Claims, 9 Drawing Sheets

FUEL SYSTEM WITH AIR VENTING AND FUEL ANTI-DRAINBACK

FIELD

A fuel system if an engine is provided with means to vent air that accumulates within a fuel filter of the fuel system and provide anti-drainback of clean fuel back into the fuel filter when the engine is turned off. The means to vent air and provide anti-drainback are integrated into a signal piece, non-biased piston valve.

BACKGROUND

FIG. 1 provides a schematic illustration of a fuel system 10 in a diesel engine. The fuel system 10 is shown to include a fuel tank 12, a low pressure fuel pump 14 pumping fuel from the tank 12, a fuel filter 16 that filters the fuel from the pump 14, and a high pressure fuel pump 18 that increases the fuel pressure and feeds the fuel to a fuel reservoir 20. From the fuel reservoir 20, the fuel is distributed to a number of fuel injectors 22 where the fuel is injected and combusted in the engine.

During operation of a diesel engine, air can accumulate within the fuel system, for example within the fuel filter. In addition, air can enter the fuel system as a result of changing the fuel filter. Regardless of how air enters the fuel system, it is desirable to provide means to vent the air from the fuel system because air can interfere with the smooth and continuous delivery of fuel to the engine, decease engine performance and possibly lead to engine damage.

A number of means to vent air from a fuel system have been provided in the past. One such means includes a vent line that connects to the flow line connecting the low pressure pump to the fuel filter, the venting line connecting to the fuel tank so that air is vented into the fuel tank. Another known method is to provide an air vent mechanism on or near the fuel filter. Manually operated mechanical venting valves and venting screws associated with the fuel filter have been often used. These mechanisms can be difficult for a person to actuate, and can lead to fuel spills if they are not actuated properly. To avoid these difficulties, automatic venting has become more common. One automatic venting method is to provide a small orifice in the fuel filter that allows air to flow out of the fuel filter and back to the fuel tank through a vent line.

FIGS. 2A-C illustrate another version of a known automatic venting mechanism 24 associated with a fuel filter. The mechanism 24 is disposed adjacent to, but downstream from, the fuel filter to receive clean fuel via an inlet port 26. A clean fuel exit port 28 leads to the engine and an air vent passage 30 connected to the fuel tank is provided for air venting. A valve mechanism is provided for controlling the flow of air and fuel through the mechanism 24. The valve mechanism includes an inner valve 32 and an outer valve 34 which cooperate together to control the flow.

The valves 32, 34 are actuated by fluid pressure generated by the upstream fuel pump, or in the absence of fuel pump pressure, by gravity. FIG. 2A shows the valves 32, 34 in a position when the engine is turned off, where the valves 32 and 34 are at their lowermost positions with the valve 32 blocking the inlet port 26 and the valve 34 blocking the exit port 28 in an effort to prevent backflow of clean fuel from the exit port 28 back through the inlet port 26. Upon starting of the engine, pressure generated by the fuel pump acts on the lower end of the valve 32, thereby lifting the valve 32 upward as shown in FIG. 2B. In this position, air is able to flow past a gap between the valve 32 and the inside of the valve 34 in which the valve 32 is disposed, through a hole in the top of the valve 34, and out the air vent passage 30 back to the fuel tank. FIG. 2C illustrates the positions of the valves 32, 34 in a topmost position once the air is vented and liquid fuel starts flowing. The fuel acts on the ends of the valves 32, 34 to lift the valves 32, 34 upward. The top of the valve 32 is lifted up to close the hole through the top of the valve 34 and prevent further venting. The valve 34 is lifted upward until a reduced diameter section thereof intersects the exit port 28. Fuel can then flow past the valve 34 between the side of the valve 34 and the interior of the valve housing to the exit port 28.

The mechanism 24 illustrated in FIGS. 2A-C uses two valves 32, 34 that cooperate together in an effort to achieve air venting and prevent backflow of clean fuel. Since two valves are used, the mechanism is somewhat complicated, and the operation of one or both of the valves 32, 34 could be impaired as a result of particulate mater or other contamination accumulating on or in the valves. In addition, the fuel must flow through a relatively narrow opening between the outside of the valve 34 and the interior of the valve housing to reach the exit port 28. This reduces the amount of fuel that can reach the exit port and increases the pressure requirements for the fuel pump for pumping the fuel. Further, an increased differential pressure from filter inlet to outlet will effectively decrease the service interval (i.e. longevity) of the filter.

An improved automatic venting means in a fuel filter system would be beneficial that permits automatic venting and prevents drainback of clean liquid fuel.

SUMMARY

An air venting assembly in a fuel system of an engine is provided with means to vent air that accumulates within a fuel filter of the fuel system and provide anti-drainback of clean fuel back toward the fuel filter when the engine is turned off. In one embodiment, the means to vent air and provide anti-drainback are integrated into a single piece, non-biased piston valve. In an alternative embodiment, the piston valve is biased to a closed position by a biasing member, such as a spring.

The fuel system includes a filter assembly that has a fuel filter, and the air venting assembly adjacent the filter assembly. The air venting assembly includes a stationary housing that has a clean fuel inlet having a first valve seat, a clean fuel outlet, and an air vent passage generally parallel to the clean fuel inlet and generally perpendicular to the clean fuel outlet, with the air vent passage having a second valve seat. A single piece piston valve is slidably disposed within the air vent passage and is movable relative thereto to: a first position in sealing engagement with the first valve seat; a second position in sealing engagement with the second valve seat; and intermediate positions between the first position and the second position.

In the first position of the piston valve, fuel flow from the clean fuel outlet through the clean fuel inlet is restricted, and preferably substantially prevented. In the second position, air flow through the air vent passage is restricted, and clean fuel is able to flow to the clean fuel outlet. The piston valve also has intermediate positions between the first position and the second position at which air can flow through the air vent passage.

The piston valve has a terminal end that faces toward the clean fuel inlet, and when the piston valve is at the second position, the terminal end surface of the piston valve is positioned between the valve seat and a surface of the clean fuel outlet that intersects the clean fuel inlet. This construction increases the flow are a for the fuel from the clean fuel inlet to the clean fuel outlet, thereby reducing the pressure requirements for the fuel pump and extending fuel filter life.

The piston valve preferably has one elastomeric seal, or a plurality of elastomeric seals, for sealing. The use of an elastomeric seal minimizes leakage of fuel from the air venting assembly during filter changes. However, in certain embodiments, the piston valve is devoid of any elastomeric seal, instead relying on material to material, for example metal, sealing. When an elastomeric seal is used, the seal is preferably supported in a manner to prevent damage to the seal particularly at the second position when the fuel pressure is high. The seal support can be provided by an enlarged shoulder adjacent the elastomeric seal.

In one embodiment, the air venting occurs back to the fuel tank of the fuel system. In an alternative embodiment, the air venting occurs to atmosphere.

DETAILED DESCRIPTION

The inventive concepts will be described herein with respect to a fuel system in a diesel engine and venting air and vapors from, and anti-drainback of, diesel fuel. However, the inventive concepts could also be used for venting and anti-drainback of other fuels in other types of engines, for example gasoline engines, and for other liquids, for example lubricating oil.

Figure 1:
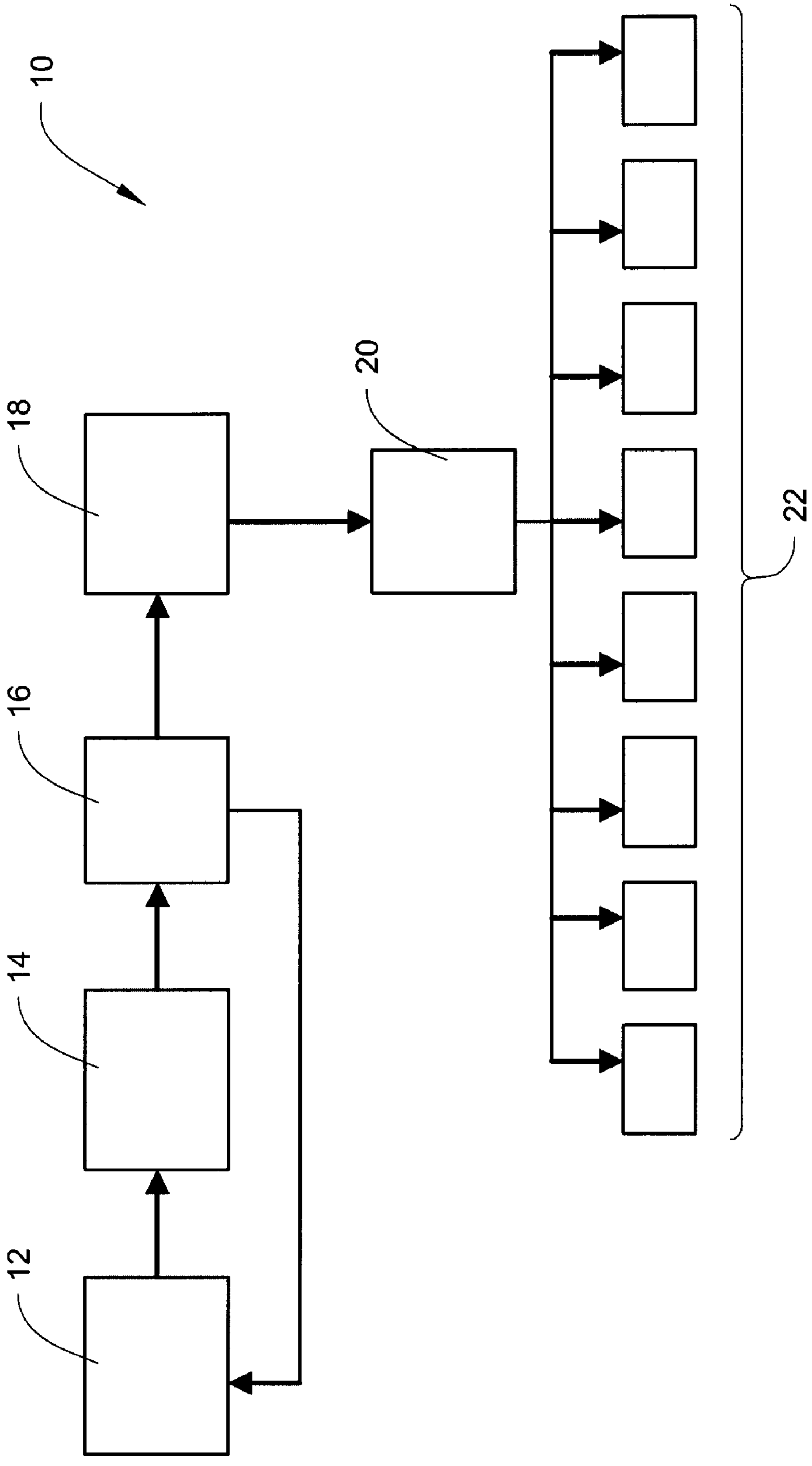
FIG. 1 is a schematic illustration of a fuel system in a diesel engine.
Figure 2A:
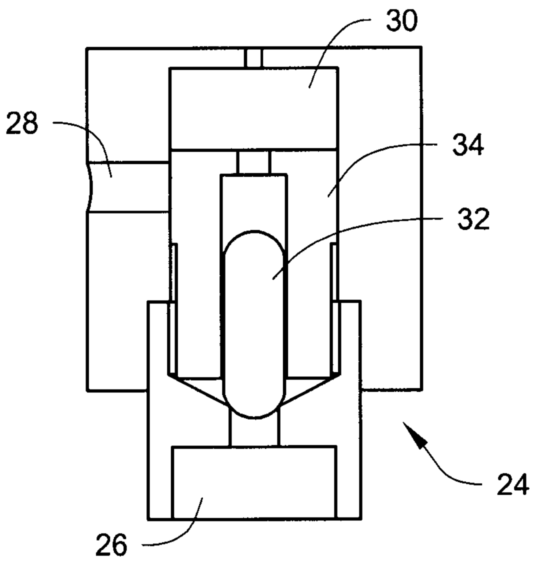
Fig. 2A (PRIOR ART)
FIGS. 2A-C illustrate a known automatic venting mechanism.
Figure 2B:
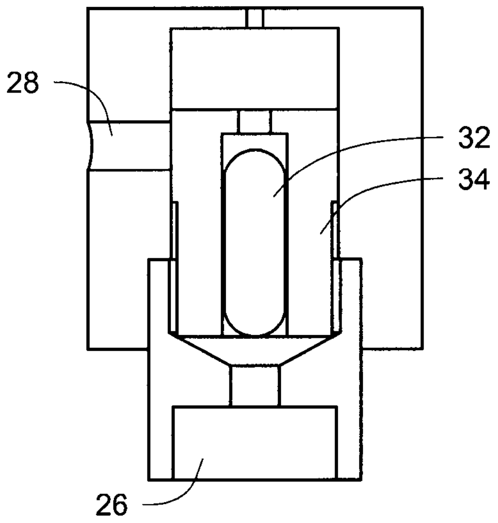
Fig. 2B (PRIOR ART)
Figure 2C:
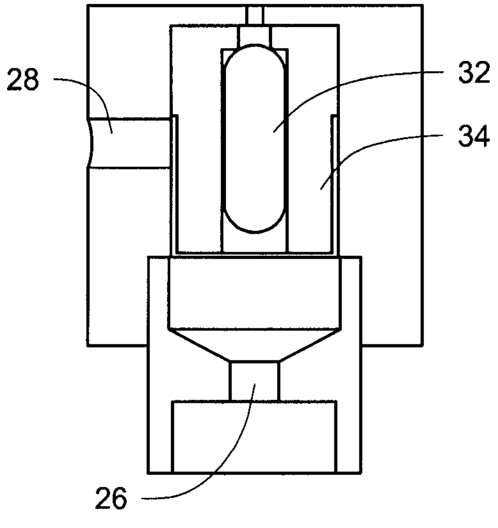
Fig. 2C (PRIOR ART)
Figure 3:
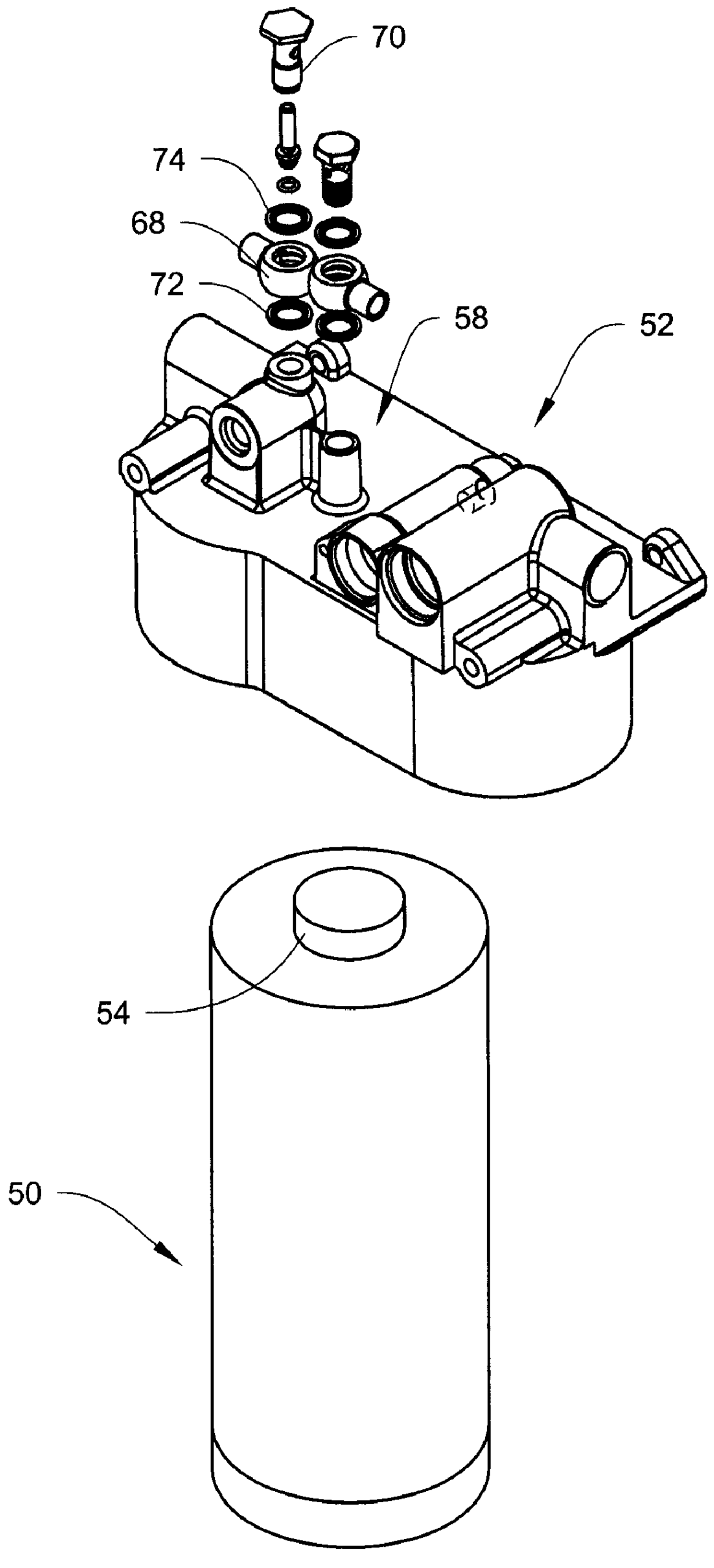
FIG. 3 is a perspective view of a portion of a fuel system with a fuel filter assembly and an air venting assembly incorporating the inventive concepts.

With reference to FIG. 3, a portion of a fuel system with a fuel filter assembly 50 and an air venting assembly 52 that incorporate the inventive concepts are illustrated. The fuel filter assembly 50 and air venting assembly 52 are used within a fuel system, such as the system illustrated in FIG. 1, so that the fuel filter assembly and air vent assembly receive fuel from the low pressure pump and direct the fuel to the high pressure pump. FIG. 3 schematically illustrates the filter assembly 50, which can be a spin-on filter assembly of a type known in the art which is designed to be threaded into engagement with the air venting assembly 52. The construction and operation of spin-on filter assemblies is well known in the art, and is not further described herein. The inventive concepts described herein would be used with other types of filter assemblies as well, for example top load filter assemblies.

The top of the filter assembly 50 includes a neck 54 that engages with a neck 56 on the air venting assembly 52 (shown in FIG. 4) when the filter assembly 50 is secured to the air venting assembly, to form a fuel flow path from the filter assembly to the air venting assembly. The filter in the filter assembly 50 can be designed for outside-in flow or fuel, with fuel exiting the filter assembly through the central axis of the filter assembly. However, other flow path configurations could be used.

Figure 4:
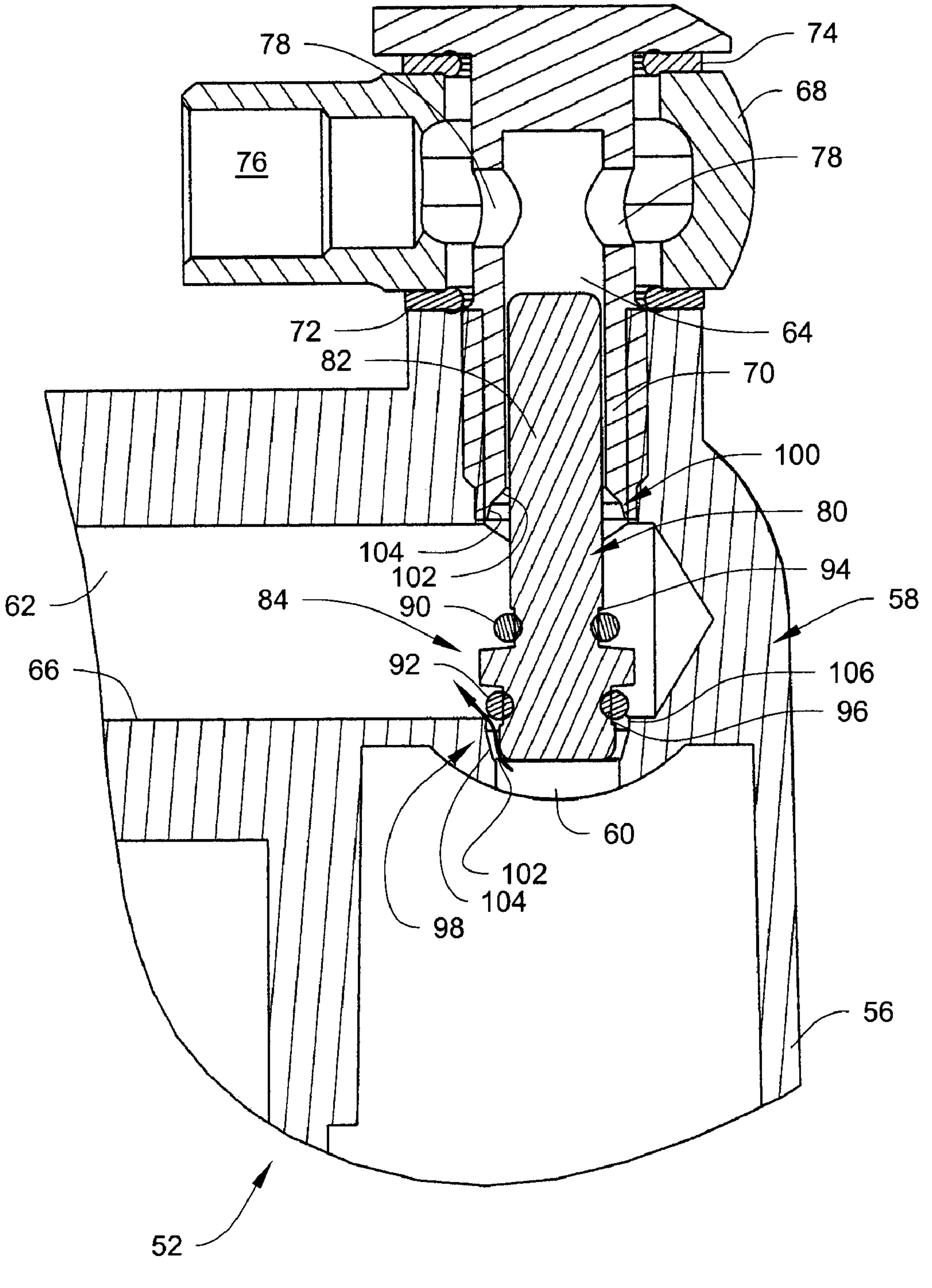
FIG. 4 is a sectional view of a portion of the air venting assembly in FIG. 3 with the piston valve in a vent position.

With reference to FIGS. 3 and 4, the air venting assembly 52 includes a housing 58 hat during use is stationary within the fuel system and is illustrated as being located vertically above the filter assembly 50. The housing 58 includes the neck 56, a clean fuel inlet 60 through which clean fuel enters the air venting assembly 52 from the fuel filter assembly, 50, a clean fuel outlet 62 connected to the high pressure pump through which clean fuel exists the housing 58, and an air vent passage 64 for venting air.

As shown in FIG. 4, the clean fuel inlet 60 is generally vertical and is on-center with the central axis of the fuel filter assembly 50. The clean fuel outlet 62 extends through the housing 58 generally perpendicular to the central axis of the inlet 60. The outlet 62, which is generally circular in cross-section, includes a bottom surface 66 that intersects the inlet 60. The vent passage 64 is generally parallel to the axis of the inlet 60, preferably coaxial with the inlet 60, and generally perpendicular to the outlet 62.

The housing 58 includes a banjo fitting 68 disposed at the top thereof, and a hollow fitting 70 extends down through the fitting 68 and is threaded into the housing 58. Washers 72, 74 are disposed between the fitting 68 and the housing, and between the fitting 70 and the fitting 68 to provide sealing. The fitting 68 includes a flow passage 76 extending at a right angle to the axis of the fitting 70, the passage 76 being connected to the fuel tank by a suitable conduit. Holes 78 in the fitting 70 connect the hollow, interior of the fitting 70 with the flow passage 76.

As illustrated in FIG. 4, the air vent passage 64 is defined by the hollow interior of the fitting 70 and extends upward from the top of the outlet 62. The vent passage 64 connects to the passage 76 via the holes 78. As a result, air passing upwardly through the vent passage 64 enters the passage 76 and is directed back to the fuel tank.

Figure 13:
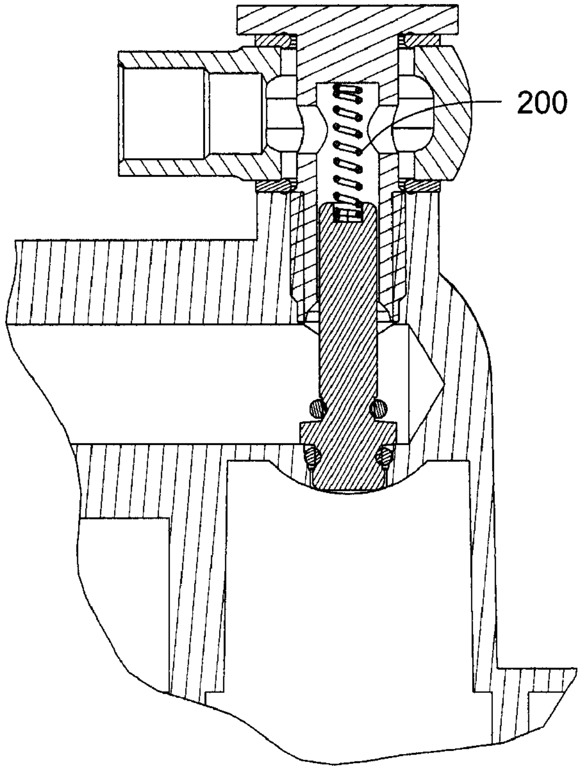
FIG. 13 is a view of yet another alternative embodiment of an air venting assembly.

A single piece piston valve 80 is slidably disposed in the vent passage 64 and extends down into the outlet 62. The valve 80 is movable to a first or full-down position, shown in FIG. 6, a second or full-up position, shown in FIG. 5, and intermediate positions between the first position and the second position (one such intermediate position being shown in FIG. 4). The valve 80 is not biased by a spring or any resilient member. Instead, movement of the valve 80 between the first position, second position and the intermediate positions is automatically controlled by the pressure of fluid (e.g. air, vapor, liquid and mixtures thereof) coming from the filter assembly 50 through the inlet 60. If desires, a biasing member, such as a spring 200 shown in FIG. 13, could be used to bias the valve 80 to the first position. The biasing force of such a biasing member would be chosen based on the fluid pressure that is present as fluid exists the filter assembly ad enter the inlet 60. A biasing member would be required in embodiments where the venting assembly 52 is positioned in a location relative to the filter assembly 50 such that the valve 80 and vent passage 64 are not oriented vertically, in which case gravity may not be able to return the valve 80 to the first position upon shutting off of the engine. In that case, the biasing member would be used to bias the valve to the first position upon engine shut off. The biasing member could act on the end of the valve 80 (i.e. the end opposite the terminal end), and be disposed between the end and the interior of the fitting 70.

Figure 12:
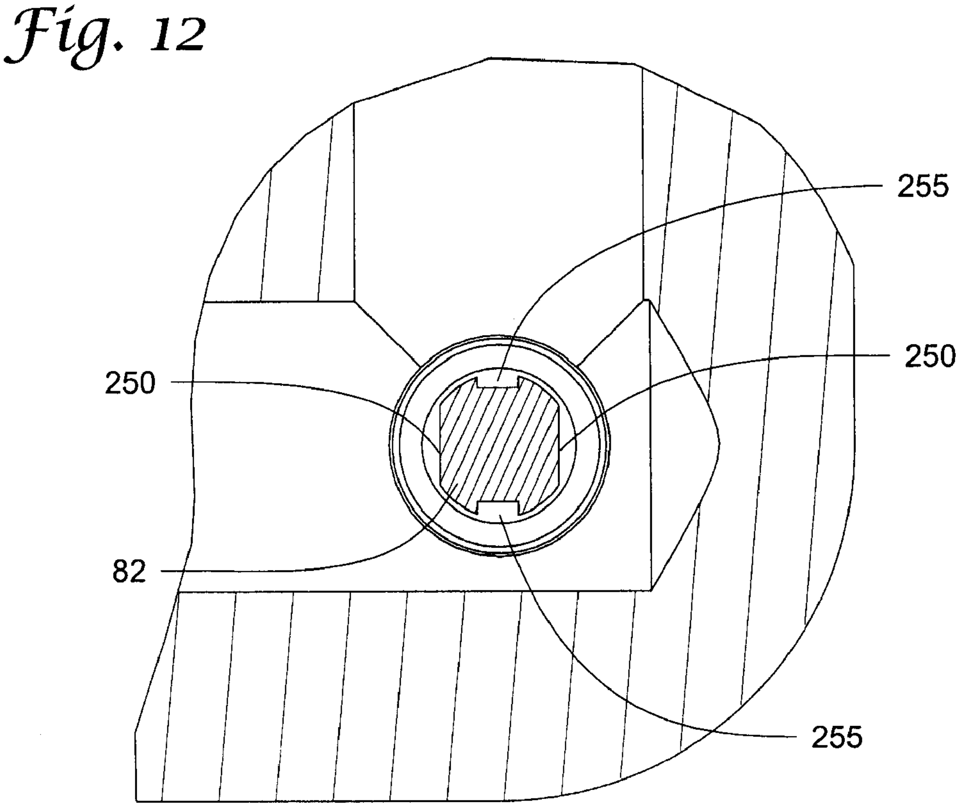
FIG. 12 is a cross-sectional view of a piston valve.

The valve 80 has a longitudinal axis that is parallel to the vent passage 64 and the inlet 60, and includes a guide section 82 and a valve head section 84. The guide section 82 is sized to slide in the vent passage 64 as the valve 80 moves up and down. At the same time the guide section 82 is sized to provide a gap between the outer circumference of the guide section and the interior of the fitting 70 to allow fluid (e.g. air, vapor, liquid) to flow between the guide section 82 and the interior of the fitting 70. Instead of sizing the guide section 82 to provide a gap, the guide section 82 and/or the interior of the fitting 70 could be provided with channels or flats to facilitate the flow of fluid through the vent passage 64 during venting. FIG. 12 illustrates the guide section 82 with flats 250 and channels 255. The flats 250 and channels 255 can be used separately or together as shown, and the number of channels or flats will vary depending upon the gas flow requirements past the guide section 82.

The valve head section 84 has a shoulder 86 that has a diameter greater than the diameter of the guide section 82, and a terminal end 88 positioned on the side of the shoulder 86 opposite from the guide section 82 and that faces the inlet 60. The terminal end 88 is sized so a as to fit within the inlet 60.

A first seal 90 and a second seal 92, for example elastomeric o-ring seals, are disposed on opposite sides of the shoulder 86. The first seal 90 is disposed in a circumferential channel 94 formed around the guide section 82 while the second seal 92 is disposed in a circumferential channel 96 formed around the terminal end 88.

Figure 5:
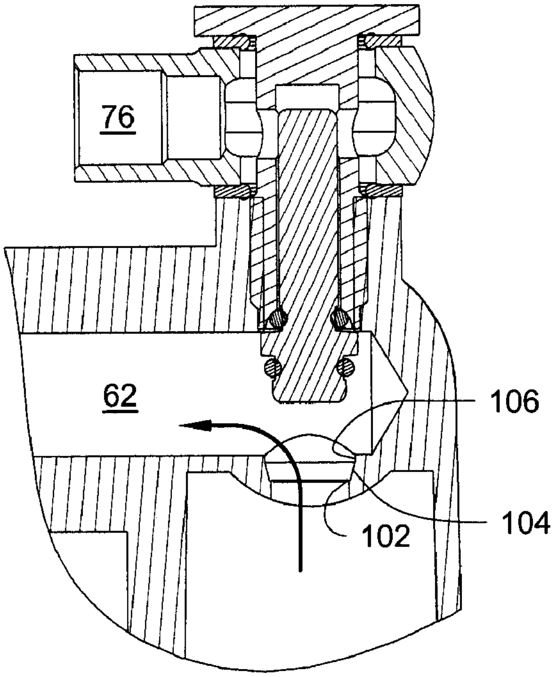
FIG. 5 is a view similar to FIG. 4 with the piston valve in a full-up position to restrict air venting.
Figure 6:
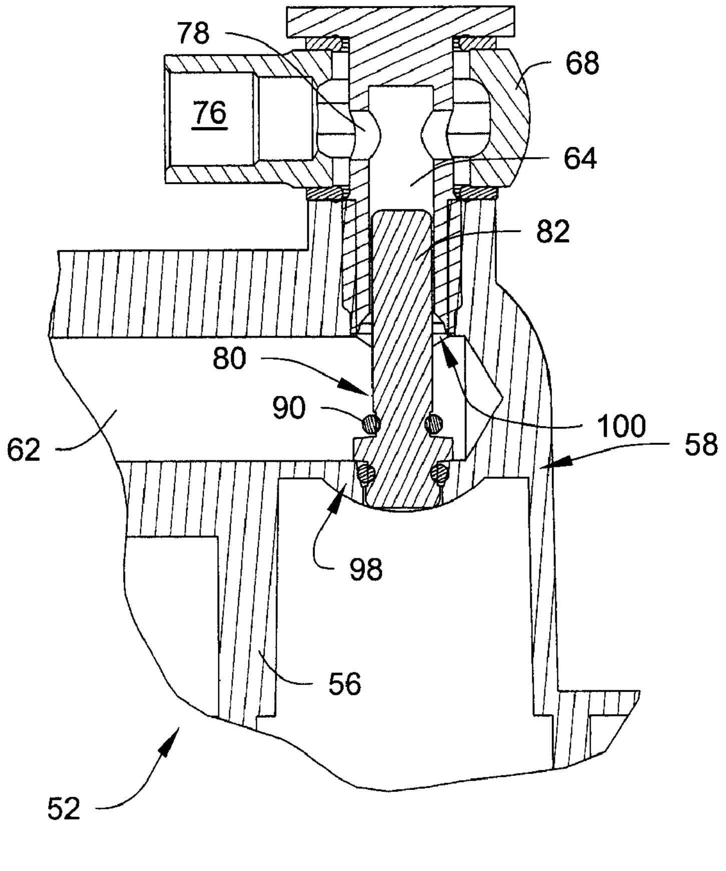
FIG. 6 is a view similar to FIG. 4 with the piston valve in a full-down position to provide anti-drainback of clean liquid fuel back to the fuel filter.

As shown in FIG. 6, the seal 92 is designed to seat against a first valve seat 98 formed at the upper end of the inlet 60 when the valve 80 moves to the first position. Similarly, as shown in FIG. 5, the seal 90 is designed to seat against a second valve seat 100 formed at the end of the fitting 68. As best seen in FIG. 4, both of the valve seats 98, 10 have a double chamfer configuration with a first chamfer section 102 angled from approximately 40-50 degrees, more preferably 45 degrees, relative to a vertical axis, and a second chamfer section 104 angled from approximately 15-25 degrees, more permeably 20 degrees, from vertical. The valve seat 98 further includes a generally vertical section 106. The first chamfer sections 102 provide an angled surface that is suitable for sealing engagement with the seals 90, 92, while the second chamfer sections 104 help to guide the valve head section 84 to the first and second positions.

FIG. 6 illustrates the first position of the valve 80 which is achieved when the engine is not operating and the fuel pump is not generating pressure on the filter side of the vent assembly 52. As a result, gravity causes the valve 80 to move down to the first position into sealing engagement with the valve seat 98. In the first position, the sealing engagement between the seal 92 and the valve seat 98 is sufficient to substantially prevent the flow of fuel from the outlet 62 back through the inlet 60. This keeps fuel in the outlet 62 and downstream portions of the fuel system to aid in starting the engine. In addition, this prevents fuel leakage from the venting assembly through the inlet 60 when the filter assembly 50 is removed during a filter change.

Upon cranking and starting of the engine, the pressure created by the fuel pump acts on the valve 80 and the valve 80 is lifted upward from the valve seat 98, as shown in FIG. 4. Air, vapor and small amounts of liquid fuel can thus flow from the filter assembly 50 and into the venting assembly 52 through the inlet 60 past the valve head section 84, as indicated by the arrow in FIG. 1. Air and vapor can then flow into the vent passage 64 through the gap between the guide section 82 and the fitting 70 and into the passage 76 for routing back to the fuel tank.

While air is present, the viscosity difference between air and liquid is used to keep the valve 80 in an intermediate venting position. However, once the air is purged and liquid begins to flow, enough differential pressure is created to lift the valve upward to the second or full-up position shown in FIG. 5. In this position, the seal 90 is in sealing engagement with the valve seat 100 to substantially prevent the flow of fuel through the vent passage 64, forcing the fuel to flow through the outlet 62.

Upon shutting off of the engine, the fuel flow is stopped, and the valve 80 moves back down to the first position shown in FIG. 6 as a result of gravity.

When in the first and second positions, especially the second position where the fuel pressure acting on the valve 80 is the highest, the position of the shoulder 86 is such that the shoulder 86 supports the seals 90, 92 from behind to prevent damage to the seals.

FIGS. 7-11 illustrate variations of air venting assemblies that incorporate one or more of the inventive concepts described herein. In FIGS. 7-11, parts identical to parts in the venting assembly 52 are referenced by identical reference numbers.

Figure 7:
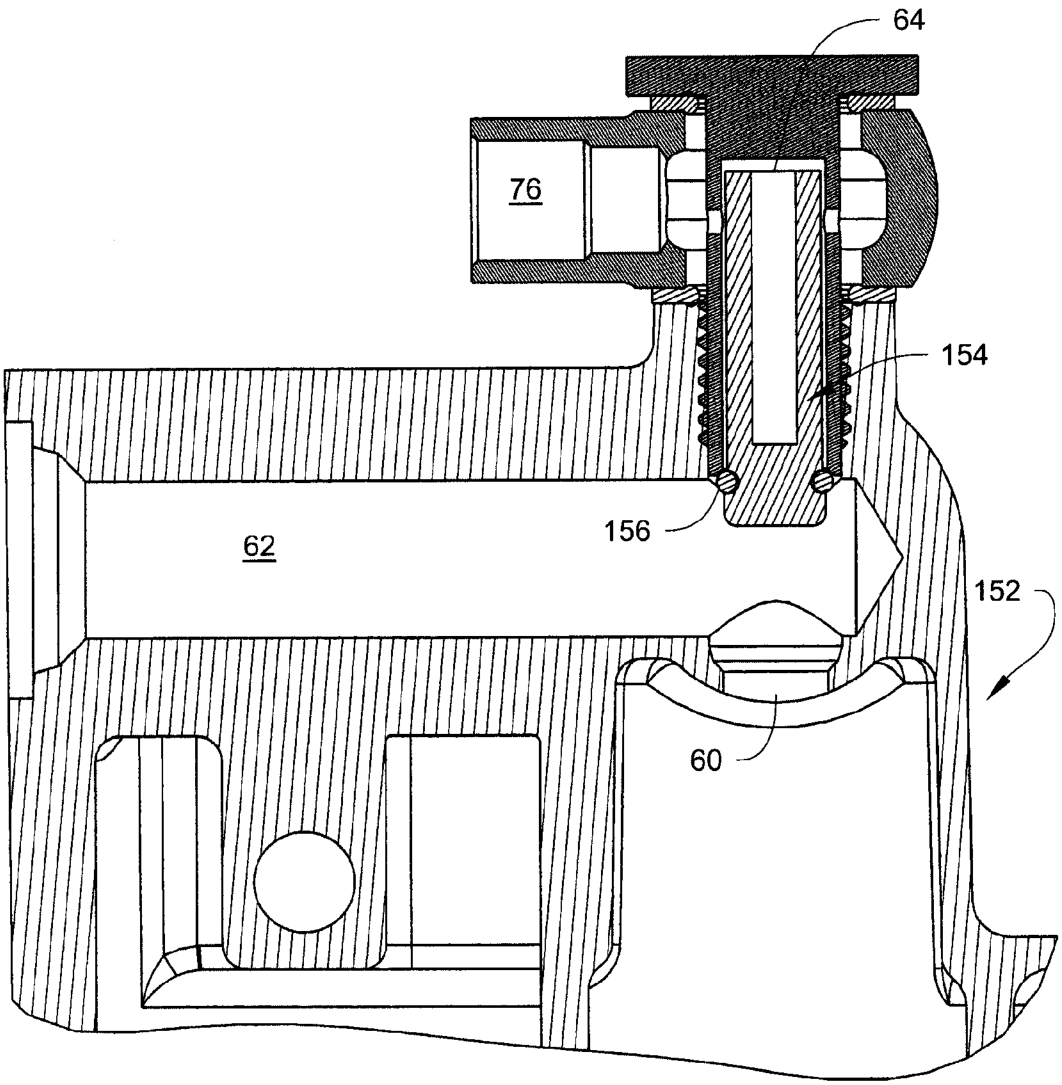
FIG. 7 is a section view of a portion of an air venting assembly illustrating an alternative embodiment of a piston valve.

FIG. 7 illustrates a variation of an air venting assembly 152 where the assembly 152 includes a piston valve 154 that uses a single elastomeric seal 156, without a shoulder backing the seal 156. As with the valve 80, the valve 154 is movable to a first position (not shown) in sealing engagement with the inlet 60, a second position (shown in FIG. 7), and intermediate positions therebetween. With this construction, the guide section of the valve 154 is able to move farther up the vent passage 64 compared to the valve 80, and the size of the valve head section is reduced, thereby reducing obstruction to fuel flowing from the inlet 60 to the outlet 62.

Figure 8:
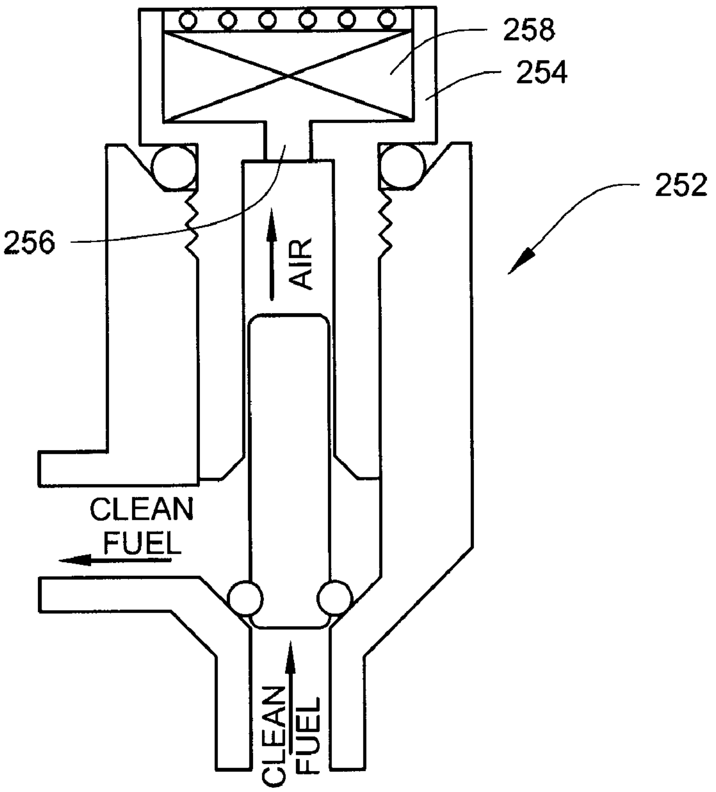
FIG. 8 is a view of another alternative embodiment of an air venting assembly that vents to atmosphere.

FIG. 8 illustrates a variation of an air venting assembly 252 that vents to atmosphere rather than back to the fuel tank. In this embodiment, the hollow fitting 254 is provided with an aperture 256 at the end thereof, and a membrane 258 is mounted within the end of the fitting 254. The membrane 258 is constructed to allow flow of air therethrough, but prevent flow of liquid. A suitable material for the membrane is a porous metal available from Mott Corporation of Farmington, Conn. Other materials could be used for the membrane. For example, a plurality of layers of a fuel filter media could be used.

Figure 9:
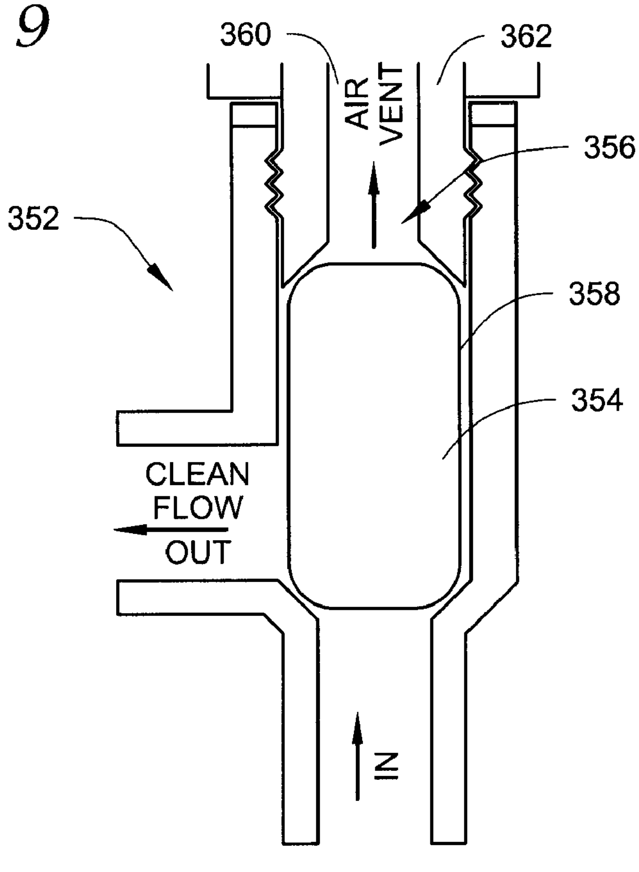
FIG. 9 is a view of another alternative embodiment of an air venting assembly.

FIG. 9 illustrates an air venting assembly 352 with a valve 354 devoid of elastomeric seals. Instead, the valve 354 relies upon material to material sealing between the opposite ends of the valve with the valve seats. In addition, a vent passage 356 is formed by a first portion 358 and a second portion 360 within a hollow fitting 362. As a result, no portion of the valve 354 slides within the fitting 362. Instead, movement of the valve 354 is guided by the first portion 358 of the vent passage which is defined by the housing.

In the embodiment in FIG. 9, when sealing engagement between the ends of the valve and the valve seats occurs, some minimal fluid leakage may occur. At the top end of the valve 354, leakage at the second position of the valve 354 may actually be desirable in certain circumstances to allow for continual venting of air through the vent passage 356 while the engine is running. The sealing engagement at the second position may actually be designed for "intentional leakage"

for this purpose, i.e. although in sealing engagement, a defined amount of air is permitted to leak past the seal.

Figure 10:
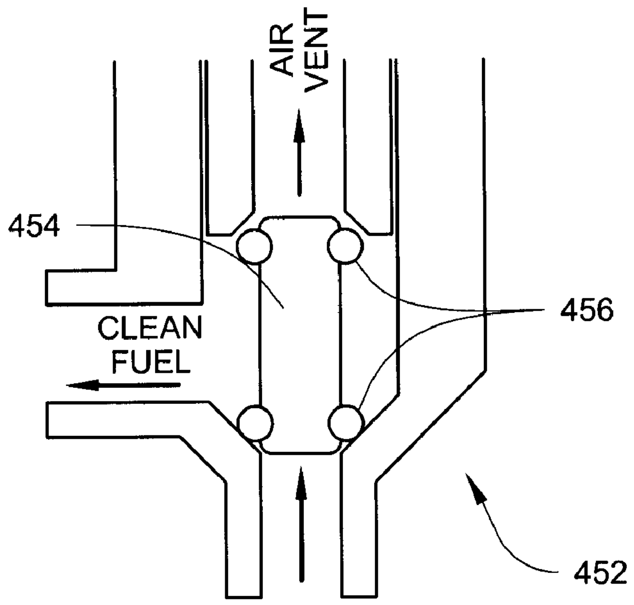
FIG. 10 is a view of yet another alternative embodiment of an air venting assembly.

FIG. 10 illustrates an air venting assembly 452 with a valve 454 having elastomeric seals 456 adjacent the ends thereof rather than being positioned adjacent a common end as in the venting assembly 52.

Figure 11:
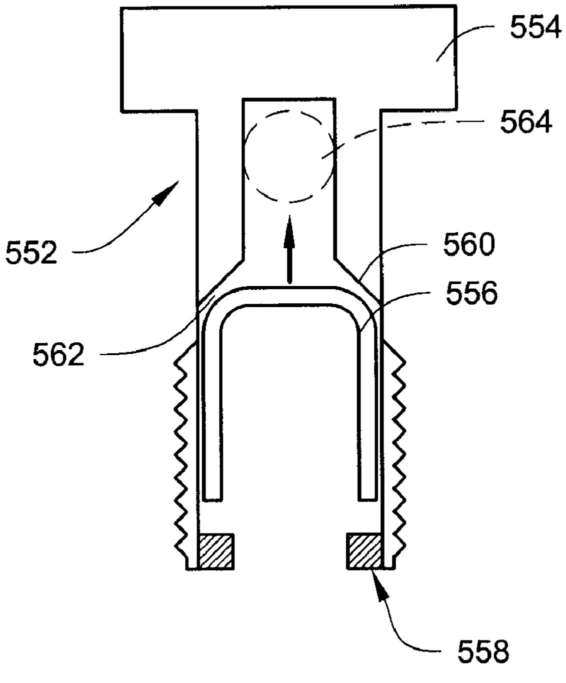
FIG. 11 is a view of yet another alternative embodiment of an air venting assembly.

FIG. 11 illustrates an air venting assembly 552 that only provides for air venting; it does not provide anti-drainback of fuel through an inlet back to the fuel filter assembly. The assembly 552 includes a hollow fitting 554. A cup-shaped valve 556 is slidably disposed within the fitting 554, with the cup side facing down and its rounded bottom facing upward. A retainer 558, for example a press-fit retainer or snap-ring, is secured into the end of the fitting to limit downward movement of the valve 556 and prevent the valve 556 from falling from the fitting. A chamfered surface 560 is formed on the interior of the fitting to limit upward movement and define a valve seat for sealing engagement with the rounded end of the valve 556.

When air is present, the valve 556 is lifted upward from the retainer 558, allowing air to flow into and through a vent passage 562 around the gap between the outer circumference of the valve 556 and the interior of the fitting 554 to an outlet 564 at the upper end of the fitting 554. This permits rapid removal of air, followed by a choking of liquid flow.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fuel system air venting assembly, comprising:

a stationary housing that includes a clean fuel inlet having a first valve seat, a clean fuel outlet, and an air vent passage generally parallel to the clean fuel inlet and generally perpendicular to the clean fuel outlet, the air vent passage having a second valve seat;

a single piece piston valve slidably disposed within the air vent passage and movable relative thereto to:

a) a first position in sealing engagement with the first valve seat restricting reverse fuel flow through the clean fuel inlet;

b) a second position in sealing engagement with the second valve seat; and c) intermediate positions between the first position and the second position;

the single piece piston valve includes a guide section that is disposed in and movable within the air vent passage when the single piece piston valve is at the first position and the second position.

2. The assembly of claim 1, wherein at the first position, the sealing engagement with the first valve seat is sufficient to substantially prevent the reverse flow of fuel through the clean fuel inlet.

3. The assembly of claim 1, wherein the single piece piston valve has one elastomeric seal, a plurality of elastomeric seals, or is devoid of any elastomeric seal.

4. The assembly of claim 1, wherein the single piece piston valve includes an elastomeric seal, and an enlarged shoulder adjacent the elastomeric seal to support the elastomeric seal.

5. The assembly of claim 1, wherein the assembly is devoid of a bias member acting on the single piece piston valve.

6. The assembly of claim 1, further comprising a gas permeable, liquid impermeable membrane in the air vent passage.

7. The assembly of claim 1, further comprising slots or flats on an exterior surface of the single piece piston valve.

8. The assembly of claim 1, further comprising a spring engaged with the single piece piston valve.

9. A fuel system air venting assembly, comprising:

a stationary housing that includes a clean fuel inlet having a first valve seat, a clean fuel outlet extending generally perpendicular to the clean fuel inlet, and an air vent passage generally parallel to the clean fuel inlet and generally perpendicular to the clean fuel outlet, the air vent passage having a second valve seat;

a piston valve slidably disposed within the air vent passage and movable relative thereto to:

a) a first position in sealing engagement with the first valve seat to restrict fuel flow from the clean fuel outlet through the clean fuel inlet;

b) a second position in sealing engagement with the second valve seat to restrict air flow through the air vent passage, and at which clean fuel is able to flow to the clean fuel outlet; and c) intermediate positions between the first position and the second position at which air can flow through the air vent passage;

the piston valve includes a guide section that is disposed in and movable within the air vent passage when the piston valve is at the first position.

10. The assembly of claim 9, wherein at the first position, the sealing engagement with the first valve seat is sufficient to substantially prevent the flow of clean fuel from the clean fuel outlet through the clean fuel inlet.

11. The assembly of claim 9, wherein the piston valve has one elastomeric seal, a plurality of elastomeric seals, or is devoid of any elastomeric seal.

12. The assembly of claim 9, wherein the piston valve includes an elastomeric seal, and an enlarged shoulder adjacent the elastomeric seal to support the elastomeric seal.

13. The assembly of claim 9, wherein the assembly is devoid of a bias member acting on the piston valve.

14. The assembly of claim 9, further comprising a gas permeable, liquid impermeable membrane in the air vent passage.

15. The assembly of claim 9, further comprising slots or flats on an exterior surface of the piston valve.

16. The assembly of claim 9, further comprising a spring engaged with the piston valve.

17. A fuel system air venting assembly, comprising:

a housing that includes a clean fuel inlet; a clean fuel outlet extending generally perpendicular to the clean fuel inlet, the clean fuel outlet having a surface that intersects the clean fuel inlet; and an air vent passage generally parallel to the clean fuel inlet and generally perpendicular to the clean fuel outlet, the air vent passage having a valve seat; and a piston valve slidably disposed within the air vent passage, the piston valve having a terminal end that faces toward the clean fuel inlet, and the piston valve is movable within the air vent passage including to a position in sealing engagement with the valve seat, and when the piston valve is in sealing engagement with the valve seat, the terminal end surface of the piston valve is positioned between the valve seat and the surface of the clean fuel outlet that intersects the clean fuel inlet;

the piston valve includes a guide section that is disposed in the air vent passage when the piston valve is adjacent the clean fuel inlet.

18. The assembly of claim 17, wherein the piston valve has one elastomeric seal, a plurality of elastomeric seals, or is devoid of any elastomeric seal.

19. The assembly of claim 17, wherein the piston valve includes an elastomeric seal, and an enlarged shoulder adjacent the elastomeric seal to support the elastomeric seal.

20. The assembly of claim 17, wherein the assembly is devoid of a bias member acting on the piston valve.

21. The assembly of claim 17, further comprising a gas permeable, liquid impermeable membrane in the air vent passage.

22. The assembly of claim 17, further comprising slots or flats on an exterior surface of the piston valve.

23. The assembly of claim 17, further comprising a spring engaged with the piston valve.

24. A fuel system, comprising a filter assembly that includes a fuel filter;

an air venting assembly adjacent the filter assembly, the air venting assembly includes a housing that has:

i) a clean fuel inlet that receives clean fuel from the filter assembly;

ii) a clean fuel outlet generally perpendicular to the clean fuel inlet, the clean fuel outlet having a surface that intersects the clean fuel inlet;

iii) an air vent passage generally parallel to the clean fuel inlet and generally perpendicular to the clean fuel outlet, the air vent passage having a valve seat; and iv) a piston valve slidably disposed within the air vent passage, the piston valve having an end surface that faces toward the filter assembly, and the piston valve is movable within the air vent passage including to a position in sealing engagement with the valve seat; wherein when the piston valve is in sealing engagement with the valve seat, the end surface of the piston is positioned between the valve seat and the surface of the clean fuel outlet that intersects the clean fuel inlet, the piston valve includes a guide section that is disposed in the air vent passage when the piston valve is adjacent the clean fuel inlet.

25. The fuel system of claim 24, wherein the clean fuel outlet is connected to an engine, the clean fuel inlet receives pressurized fuel from a fuel pump, and the air vent passage is connected to a fuel tank or to atmosphere.

26. The fuel system of claim 24, wherein the air vent passage extends vertically, and the air venting assembly is devoid of a bias member acting on the piston valve.

27. The fuel system of claim 24, wherein the clean fuel inlet includes a valve seat, and the piston valve includes an elastomeric seal that is sealable with the valve seat of the clean fuel inlet to substantially prevent the flow of liquid from the clean fuel outlet through the clean fuel inlet toward the filter assembly.

* * * * *